US012159575B2

(12) United States Patent
Harada et al.

(10) Patent No.: US 12,159,575 B2
(45) Date of Patent: Dec. 3, 2024

(54) DISPLAY DEVICE

(71) Applicant: Japan Display Inc., Tokyo (JP)

(72) Inventors: Kenji Harada, Tokyo (JP); Tetsuo Morita, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/480,528

(22) Filed: Oct. 4, 2023

(65) Prior Publication Data

US 2024/0119893 A1 Apr. 11, 2024

(30) Foreign Application Priority Data

Oct. 6, 2022 (JP) ................................ 2022-161675

(51) Int. Cl.
*G09G 3/3225* (2016.01)

(52) U.S. Cl.
CPC ... *G09G 3/3225* (2013.01); *G09G 2300/0861* (2013.01); *G09G 2310/0286* (2013.01); *G09G 2310/08* (2013.01); *G09G 2320/0233* (2013.01)

(58) Field of Classification Search
CPC ......... G09G 3/3225; G09G 2300/0861; G09G 2310/0286; G09G 2310/08; G09G 2320/0233; G09G 3/36; G09G 3/3233; G09G 2360/12; G09G 2360/18
See application file for complete search history.

(56) References Cited

U.S. PATENT DOCUMENTS

2006/0043263 A1* 3/2006 Hatano ................. H01L 29/768 257/E27.15
2008/0303762 A1* 12/2008 Yasuda ................ G09G 3/3655 345/87
2012/0081346 A1* 4/2012 Furuta .................... G11C 19/28 377/64
2015/0009224 A1* 1/2015 Tanaka ................. G09G 3/3648 345/534

FOREIGN PATENT DOCUMENTS

JP 2006-101483 A 4/2006
JP 2008-304512 A 12/2008

* cited by examiner

*Primary Examiner* — Michael A Faragalla
(74) *Attorney, Agent, or Firm* — XSENSUS LLP

(57) ABSTRACT

According to one embodiment, a display device includes a pixel circuit provided in each of a plurality of pixels, a plurality of flip-flop circuits provided in a shift register and a reset element provided in each of the flip-flop circuits, and the reset element is an n-channel type transistor, the pixel circuit includes a light emitting element, a light emitting power supply and a switch element, and the light emitting element is disconnected from the light emitting power supply while the light emitting power supply is rising.

8 Claims, 11 Drawing Sheets

DISPLAY DEVICE

CROSS-REFERENCE TO RELATED APPLICATIONS

This application is based upon and claims the benefit of priority from Japanese Patent Application No. 2022-161675, filed Oct. 6, 2022, the entire contents of which are incorporated herein by reference.

FIELD

Embodiments described herein relate generally to a display device.

BACKGROUND

Reset circuits that sets the potential of the liquid crystal layer of a display device to a predetermined potential and reset circuits that reset the shift register have been developed.

DETAILED DESCRIPTION

Figure 1:
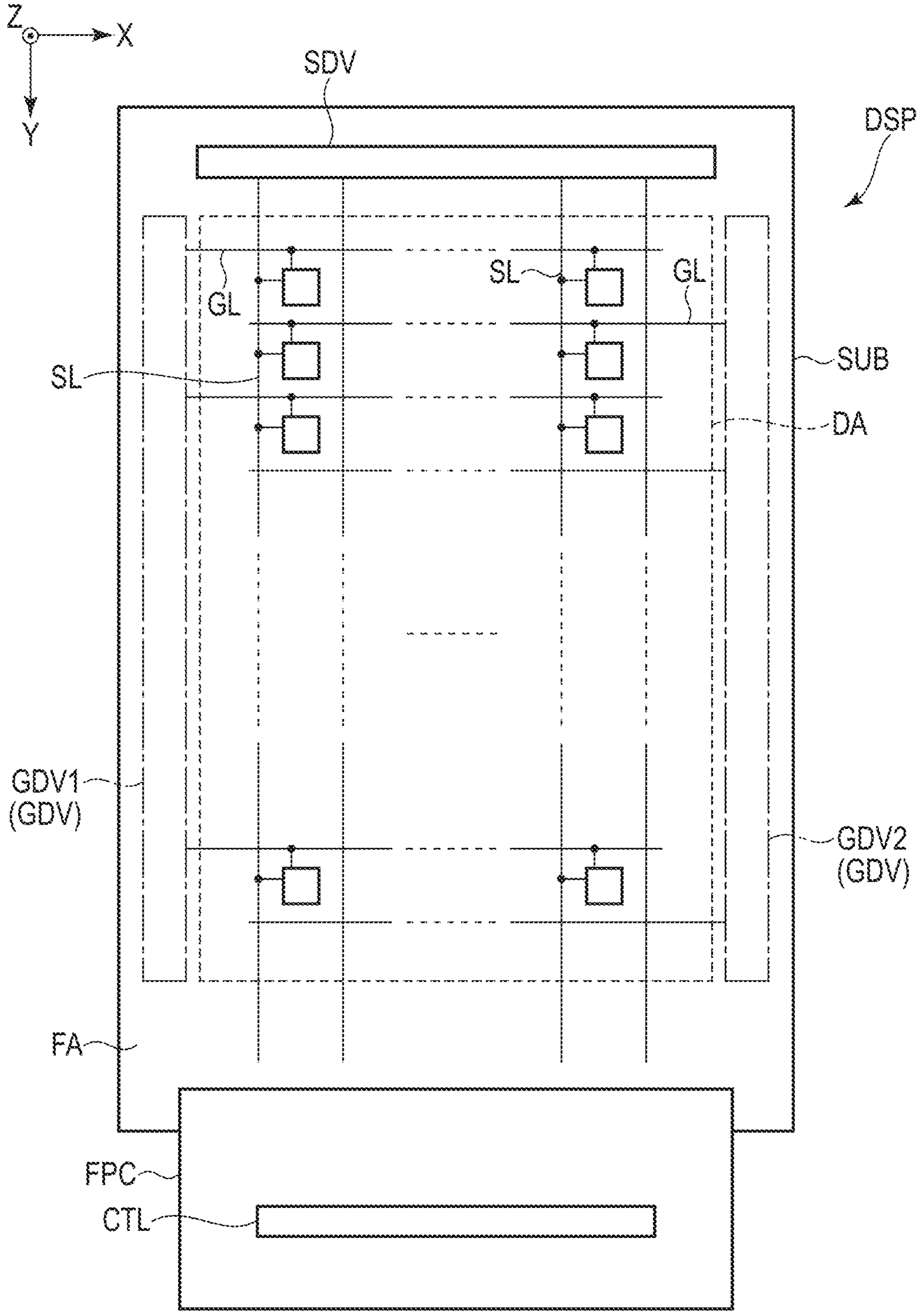
FIG. 1 is a plan view schematically showing a configuration example of a display device of an embodiment.

In general, according to one embodiment, a display device comprises:

a plurality of pixels;

a pixel circuit provided in each of the plurality of pixels;

a plurality of scanning lines connected to the plurality of pixels;

a plurality of signal lines connected to the plurality of pixels;

a scanning line drive circuit connected to the plurality of scanning lines;

a signal line drive circuit connected to the plurality of pixels;

a shift register provided in the scanning line drive circuit;

a plurality of flip-flop circuits provided in the shift register; and a reset element provided in each of the plurality of flip-flop circuits, wherein the reset element is an n-channel type transistor, the pixel circuit includes a light emitting element, a light emitting power supply and a switch element, and the light emitting element is disconnected from the light emitting power supply while the light emitting power supply is rising.

According to another embodiment, a display device comprises:

a plurality of pixels;

a pixel circuit provided in each of the plurality of pixels;

a plurality of scanning lines connected to the plurality of pixels;

a plurality of signal lines connected to the plurality of pixels;

a scanning line drive circuit connected to the plurality of scanning lines;

a signal line drive circuit connected to the plurality of pixels;

a shift register provided in the scanning line drive circuit;

a plurality of flip-flop circuits provided in the shift register; and a reset element provided in each of the plurality of flip-flop circuits, wherein the reset element is a NAND gate, the pixel circuit includes a light emitting element, a light emitting power supply and a switch element, and the light emitting element is disconnected from the light emitting power supply while the light emitting power supply is rising.

An object of this embodiment is to provide a display device which prevents undesired light emission, thereby improving display quality.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

The embodiments described herein are not general ones, but rather embodiments that illustrate the same or corresponding special technical features of the invention. The following is a detailed description of one embodiment of a display device with reference to the drawings.

In this embodiment, a first direction X, a second direction Y and a third direction Z are orthogonal to each other, but may intersect at an angle other than 90 degrees. The direction toward the tip of the arrow in the third direction Z is defined as up or above, and the direction opposite to the direction toward the tip of the arrow in the third direction Z is defined as down or below. Note that the first direction X, the second direction Y and the third direction Z may as well be referred to as an X direction, a Y direction and a Z direction, respectively.

With such expressions as "the second member above the first member" and "the second member below the first member", the second member may be in contact with the first member or may be located away from the first member.

In the latter case, a third member may be interposed between the first member and the second member. On the other hand, with such expressions as "the second member on the first member" and "the second member beneath the first member", the second member is in contact with the first member.

Further, it is assumed that there is an observation position to observe the display device on a tip side of the arrow in the third direction Z. Here, viewing from this observation position toward the X-Y plane defined by the first direction X and the second direction Y is referred to as plan view. Viewing a cross-section of the display device in the X-Z plane defined by the first direction X and the third direction Z or in the Y-Z plane defined by the second direction Y and the third direction Z is referred to as cross-sectional view.

EMBODIMENTS

FIG. 1 is a plan view schematically showing a configuration example of a display device of Embodiment 1. In a display device DSP shown in FIG. 1, a substrate SUB1 comprises a display area DA, a peripheral area FA surrounding the display area DA, scanning line drive circuits GDV (a scanning line drive circuit GDV1 and a scanning line drive circuit GDV2) and a signal line drive circuit SDV provided in the peripheral area FA.

The display area DA includes a plurality of pixels PX, and the plurality of pixels PX are arranged in a matrix. Each of the plurality of pixels PX is provided at an intersection between each of a plurality of scanning lines GL and each respective one of a plurality of signal lines SL. Each of the plurality of pixels PX is connected to the corresponding scan line GL and signal line SL.

The peripheral area FA is an area on an outer side of the display area DA. In the peripheral area FA includes, the scanning line drive circuits GDV (scanning line drive circuit GDV1 and scanning line drive circuit GDV2), the signal line drive circuit SDV, and a wiring board FPC that is connected thereto via terminals (not shown) are located. In the example shown in FIG. 1, scanning lines GL extends from the scanning line drive circuit GDV. The odd-numbered scanning lines GL are connected to the scanning line drive circuit GDV1. The even-numbered scanning lines GL are connected to the scanning line drive circuit GDV2. Note here that the scanning line drive circuit does not necessarily have to be divided into two, but all scanning lines GL may be connected to one scanning line drive circuit. Signal lines SL extend from the signal line drive circuit SDV. A drive elements CTL is provided on the wiring board FPC. The drive element CTL is, for example, a driver IC.

Video signals and various types of control signals are supplied from outside the display device DSP via the wiring board FPC. The video signals are input to the plurality of pixels PX via the drive elements CTL, respectively. The various drive signals are input to the scanning line drive circuit GDV and the signal line drive circuit SDV via the drive elements CTL. Based on the video signals and various control signals, the pixels PX emit light.

The scanning line drive circuit GDV, the signal line drive circuit SDV and the pixels PX shown in FIG. 1 each may comprise a shift register. The shift register is constituted, for example, by a plurality of flip-flop circuits connected together. The display device DSP of this embodiment is assumed to include m scanning lines GL and n signal lines SL, that is, m×n pixels PX. For example, the shift register of the scanning line drive circuit GDV includes m (m stages of) flip-flop circuits. Each of the m flip-flop circuits is connected to the respective scanning line GL.

The operation of the shift register will now be described. First, a start pulse (start signal) is input to the flip-flop circuit of the first stage. When the flip-flop circuit of each stage outputs a pulse, the pulse is supplied to the respective scanning line GL as a gate signal. Along with this, the pulse is input to the flip-flop circuit of the next stage as a carry signal. As a result, starting from the first stage, each flip-flop outputs a pulse in turn.

Figure 2:
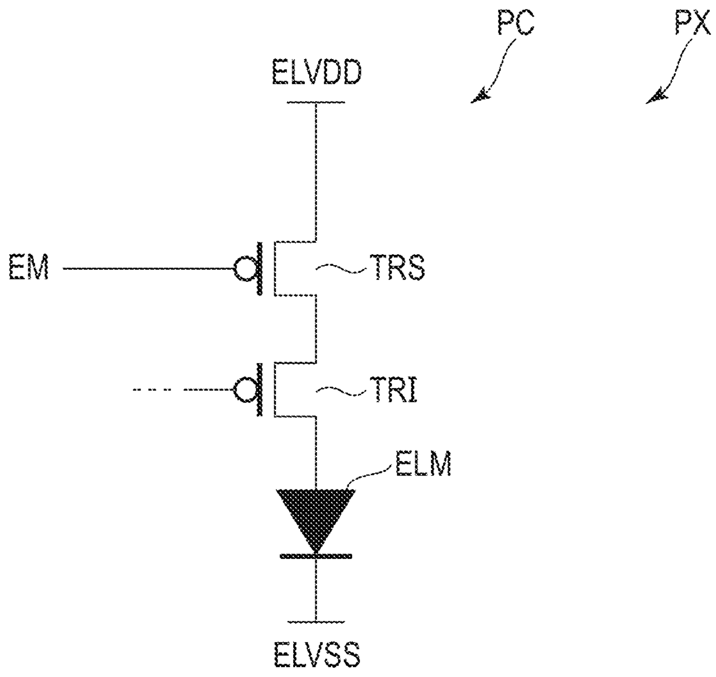
FIG. 2 is a circuit diagram showing a pixel circuit.

FIGS. 2 to 5 are each a circuit diagram of a pixel circuit. In FIG. 2, a pixel circuit PC provided in each of the pixels PX comprises a transistor TRS that functions as a switch element, a transistor TRI that is a current control transistor and a light emitting element ELM. The light emitting element ELM is an organic electroluminescent (EL) light emitting element.

A light emission signal EM is input to the gate of the transistor TRS. One of the source and drain of the transistor TRS is connected to a high-potential power supply ELVDD. The other one of the source and drain of the transistor TRS is connected to one of the source and drain of the transistor TRI. The light emission signal EM corresponds to the gate signal supplied to the scanning line GL described above.

The gate of the transistor TRI is connected to some other element of the pixel circuit PC. One of the source and drain of the transistor TRI is connected to the other one of the source and drain of the transistor TRS. The other one of the source and drain of transistor TRI is connected to a positive electrode (anode) of the light emitting element ELM. A negative electrode (cathode) of the light emitting element ELM is connected to a low-potential power supply ELVSS.

Figure 3:
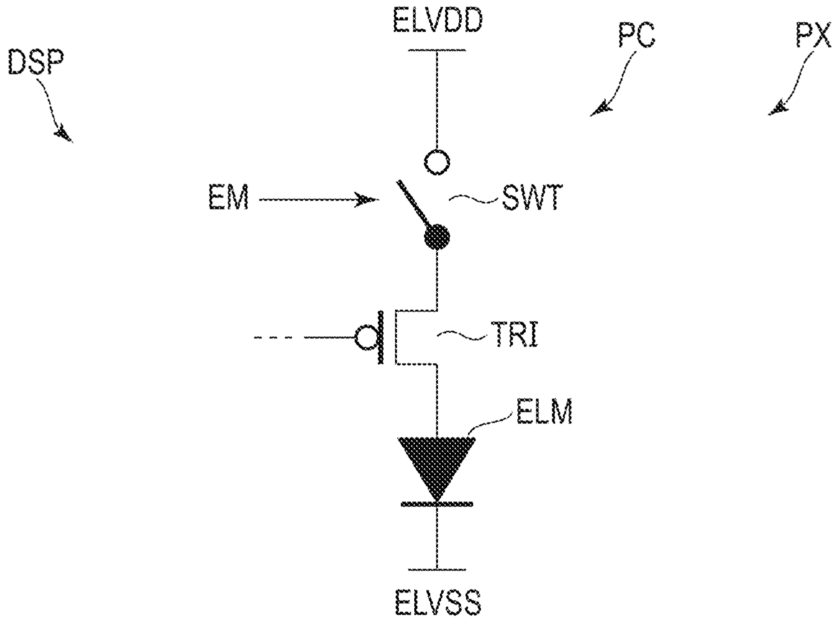
FIG. 3 is a circuit diagram showing a pixel circuit.
Figure 4:
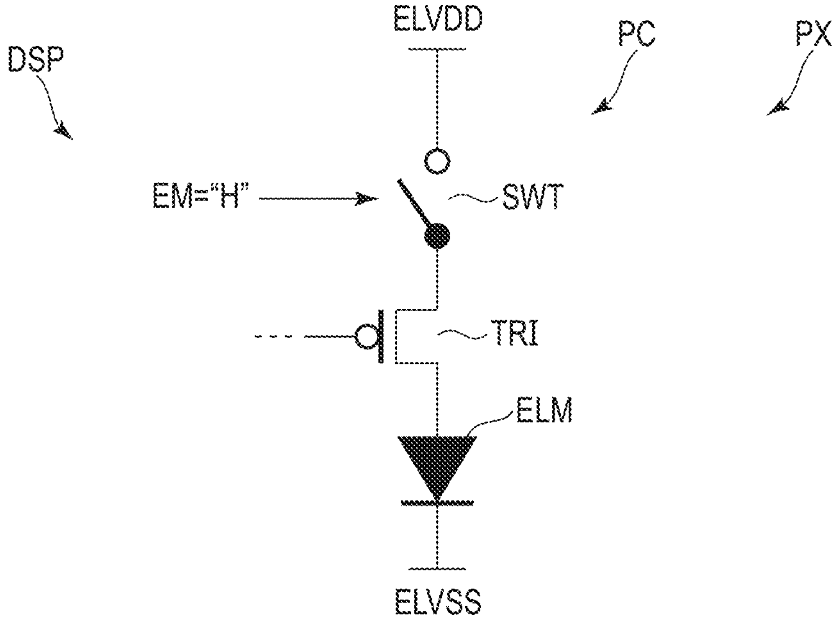
FIG. 4 is a circuit diagram showing a pixel circuit.
Figure 5:
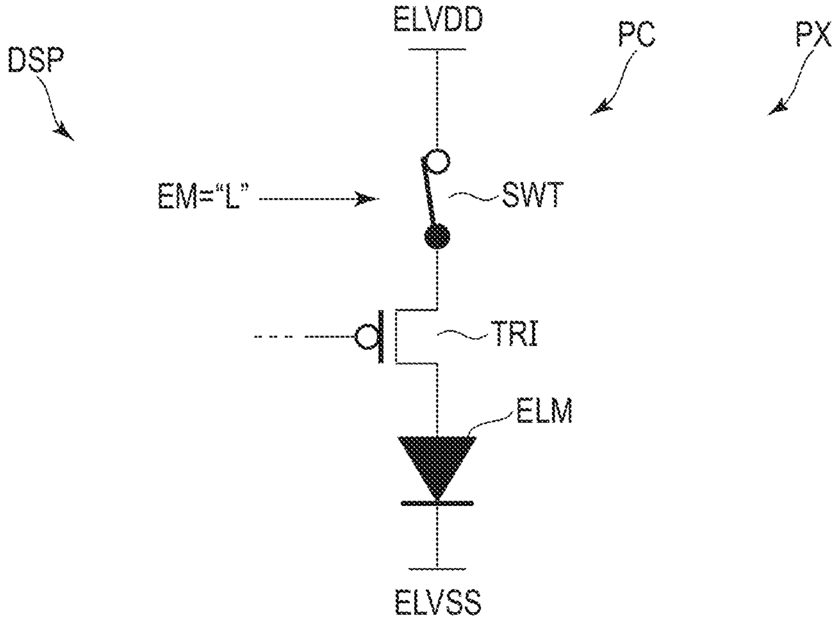
FIG. 5 is a circuit diagram showing a pixel circuit.

The transistor TRS functions as a switch element that connects the high-potential power supply ELVDD and the low-potential power supply ELVSS to the light emitting element ELM. FIGS. 3 to 5 each show a pixel circuit PC in which the transistor TRS of FIG. 2 is redrawn as a switch element SWT.

In driving the light emitting element ELM to emit light, the first operation is start up the high-potential power supply ELVDD and the low-potential power supply ELVSS. The high-potential power supply ELVDD and the low-potential power supply ELVSS are, for example, 5V and 0V power supplies, respectively. The start-up of the high-potential power supply ELVDD and the low-potential power supply ELVSS is to fix the potentials of the high-potential power supply ELVDD and the low-potential power supply ELVSS so that the potential difference between the high-potential power supply ELVDD and the low-potential power supply ELVSS is 5V.

At this point, the high-potential power supply ELVDD and the low-potential power supply ELVSS are started up while the switch element SWT in an off state, that is, electrically unconnected (see FIG. 3). In this embodiment, the high-potential power supply ELVDD and the low-potential power supply ELVSS may as well be referred to together simply as "power supply", "EL power supply" or "light emitting power supply". The start-up of the high-potential power supply ELVDD and the low-potential power supply ELVSS may as well be referred to simply as "power supply start-up".

Let us now consider the case where the transistor TRS, which is the switch element SWT, is a p-channel transistor. When the light emission signal EM input to the switch element SWT is at a high level (H), the switch element SWT is set in the off state (unconnected state) (see FIG. 4). On the other hand, when the light emission signal EM is at a low level (L), the switch element SWT is set in the on state (connected state) (see FIG. 5).

As mentioned above, in order to make the light emitting element ELM of this embodiment emit light, it is necessary to operate to start up the high-potential power supply ELVDD and the low-potential power supply ELVSS. Here, if a low level (L) signal is input to the switch element SWT while starting up the power supplies (power supply ELVDD and power supply ELVSS), the power supplies are connected to the light emitting element ELM. As a result, unnecessary light emission may undesirably occur in the light emitting element ELM.

Therefore, it is necessary to maintain the signal input to the switch element SWT at a high level (H) while the high-potential power supply ELVDD and the low-potential power supply ELVSS are being started up.

Figure 6:
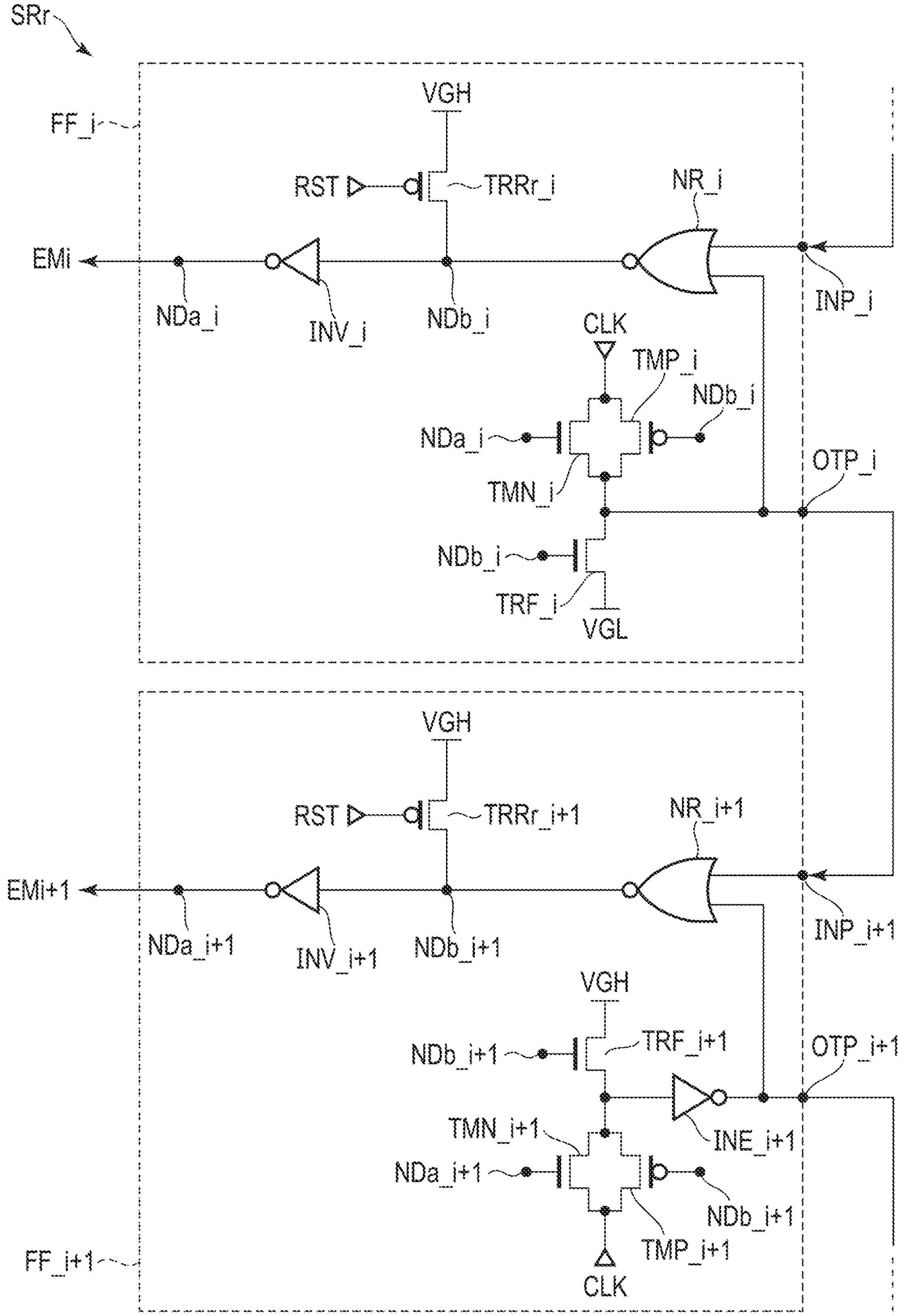
FIG. 6 is a circuit diagram showing a configuration of a shift register of a comparative example.

FIG. 6 is a circuit diagram showing a configuration of a shift register in a comparative example. A shift register SRr shown in FIG. 6 includes a flip-flop circuit FF_i of an i-th stage (where i is a natural number satisfying $1 \le i \le (m-1)$) and a flip-flop circuit FF_i+1 of a (i+1) stage.

The flip-flop circuit FF_i includes a NOR gate NR_i, a transistor TRRr_i, an inverter INV_i, a transistor TMP_i, a transistor TMN_i and a transistor TRF_i.

Note that in FIG. 6, for the sake of clarity, connection lines are omitted, but the nodes NDa_i are connected to each other. Similarly, the nodes NDb_i are connected to each other.

One of input terminals of the NOR gate NR_i is connected to the node INP_i. The other one of the input terminals of the NOR gate NR_i is connected to one of the source and drain of the transistor TMP_i, one of the source and drain of the transistor TMN_i, one of the source and drain of the transistor TRF_i and the nodes OTP_i. The output terminal of the NOR gate NR_i is connected to one of the source and drain of the transistor TRRr_i, the input terminal of the inverter INV_i and the node NDb_i.

The transistor TRRr_i is a p-channel transistor. One of the source and drain of the transistor TRRr_i is connected to the output terminal of the NOR gate NR_i, the input terminal of the inverter INV_i and the node NDb_i. The other one of the source and drain of the transistor TRRr_i is connected to the high-potential power supply VGH. A reset signal RST is input to the gate of the transistor TRRr_i. The transistor TRRr_i corresponds to a reset element.

The transistor TMP_i is a p-channel transistor. One of the source and drain of the transistor TMP_i is connected to the other one of the input terminals of the NOR gate NR_i, one of the source and drain of the transistor TMN_i, one of the source and drain of the transistor TRF_i and the node OTP_i. The other one of the source and drain of the transistor TMP_i is connected to the other of the source and drain of the transistor TMN_i, and a clock signal CLK is input thereto. The gate of the transistor TMP_i is connected to the node NDb_i.

The transistor TMN_i is an n-channel transistor. One of the source and drain of the transistor TMN_i is connected to one of the source and drain of the transistor TMP_i, the other one of the input terminals of the NOR gate NR_i, one of the source and drain of the transistor TRF_i and the node OTP_i. The other one of the source and drain of the transistor TMN_i is connected to the other one of the source and drain of the transistor TMP_i, and the clock signal CLK is input thereto. The gate of the transistor TMN_i is connected to the node NDa_i.

The transistor TMN_i and the transistor TMP_i are connected by source-to-source and drain-to-drain, and constitute a transmission gate.

The transistor TRF_i is an n-channel transistor. One of the source and drain of the transistor TRF_i is connected to one of the source and drain of the transistor TMN_i, one of the source and drain of the transistor TMP_i, the other one of the input terminals of the NOR gate NR_i and the node OTP_i. The other one of the source and drain of the transistor TRF_i is connected to the low-potential power supply VGL. The gate of the transistor TRF_i is connected to the node NDb_i.

The node INP_i is an input terminal of the flip-flop circuit FF_i. The carry signal is input to the node INP_i from the output terminal (node OTP_i−1, not shown) of the flip-flop circuit of the previous stage (flip-flop circuit FF_i−1, not shown).

The node OTP_i is an output terminal of the flip-flop circuit FF_i. The carry signal is output from the node OTP_i to the input terminal (node INP_i+1) of the next-stage flip-flop circuit FF_i+1.

A light emission signal EMi is output from the output terminal of the inverter INV_i via the node NDa_i. When the light emission signal EMi is input to the pixel circuit PC of a pixel PX as described above, the light emitting element ELM emits light.

The (i+1)-th-stage flip-flop circuit FF_i+1 includes a NOR gate NR_i+1, a transistor TRRr_i+1, an inverter INV_i+1, a transistor TMP_i+1, a transistor TMN_i+1, a transistor TRF_i+1 and an inverter INE_i+1.

As in the case provided above, for the sake of clarity in the drawing, connection lines are omitted, but the nodes NDa_i+1 are connected to each other. Similarly, the nodes NDb_i+1 are connected to each other.

One of the input terminals of the NOR gate NR_i+1 is connected to the node INP_i+1. The other one of the input terminals of the NOR gate NR_i+1 is connected to the output terminal of the inverter INE_i+1 and the node OTP_i+1. The output terminal of the NOR gate NR_i+1 is connected to one of the source and drain of the transistor TRRr_i+1, the input terminal of the inverter INV_i+1 and the node NDb_i+1.

The transistor TRRr_i+1 is a p-channel transistor. One of the source and drain of the transistor TRRr_i+1 is connected to the output terminal of the NOR gate NR_i+1, the input terminal of the inverter INV_i+1 and the node NDb_i+1. The other one of the source and drain of the transistor TRRr_i+1 is connected to a high-potential power supply VGH. The reset signal RST is input to the gate of transistor TRRr_i+1. The transistor TRRr_i+1 corresponds to the reset element.

The transistor TMP_i+1 is a p-channel transistor. One of the source and drain of the transistor TMP_i+1 is connected to the input terminal of the inverter INE_i+1, one of the source and drain of the transistor TMN_i+1 and one of the source and drain of the transistor TRF_i+1. The other one of the source and drain of the transistor TMP_i+1 is connected to the other one of the source and drain of the transistor TMN_i+1, and the clock signal CLK is input thereto. The gate of the transistor TMP_i+1 is connected to the node NDb_i+1.

The transistor TMN_i+1 is an n-channel transistor. One of the source and drain of the transistor TMN_i+1 is connected to the input terminal of the inverter INE_i+1, one of the source and drain of the transistor TMP_i+1 and one of the source and drain of the transistor TRF_i+1. The other of the source and drain of the transistor TMN_i+1 is connected to the other one of the source and drain of the transistor TMP_i+1, and the clock signal CLK is input thereto. The gate of the transistor TMN_i+1 is connected to the node NDa_i+1.

The transistor TMN_i+1 and the transistor TMP_i+1 are connected to each other by source-to-source and drain-to-drain to form a transmission gate.

The transistor TRF_i+1 is an n-channel transistor. One of the source and drain of the transistor TRF_i+1 is connected to the input terminal of the inverter INE_i+1, one of the source and drain of the transistor TMN_i+1 and one of the source and drain of the transistor TMP_i+1. The other one of the source and drain of the transistor TRF_i+1 is connected to a high-potential power supply VGH. The gate of the transistor TRF_i is connected to the node NDb_i+1.

The input terminal of the inverter INE_i+1 is connected to one of the source and drain of the transistor TRF_i+1, one of the source and drain of the transistor TMN_i+1 and one of the source and drain of the transistor TMP_i+1. The output terminal of the inverter INE_i+1 is connected to the other one of the input terminals of the NOR gate NR_i+1 and the node OTP_i+1.

The light emission signal EMi+1 is output from the output terminal of the inverter INV_i+1 via the node NDa_i+1. When the light emission signal EMi+1 is input to the pixel circuit PC of a pixel PX as described above, the light emitting element ELM emits light.

The Node INP_i+1 is the input terminal of the flip-flop circuit FF_i+1. The carry signal is input to the node INP_i+1 from the output terminal (node OTP_i) of the flip-flop circuit FF_i of the previous stage.

The node OTP_i+1 is the output terminal of the flip-flop circuit FF_i+1. From the node OTP_i+1, the carry signal is output to the input terminal (node INP_i+2 (not shown)) of the flip-flop circuit of the next stage (flip-flop circuit FF_i+2 (not shown)). When the flip-flop circuit FF_i+1 is the last stage (i+1=m), there is no flip-flop circuit in the next stage.

The circuit configuration of the flip-flop circuit FF_i is used for flip-flop circuits of odd-numbered-stages, for example. The configuration of the flip-flop circuit FF_i+1 circuit is used for flip-flop circuits of even-numbered stages, for example.

Figure 7:
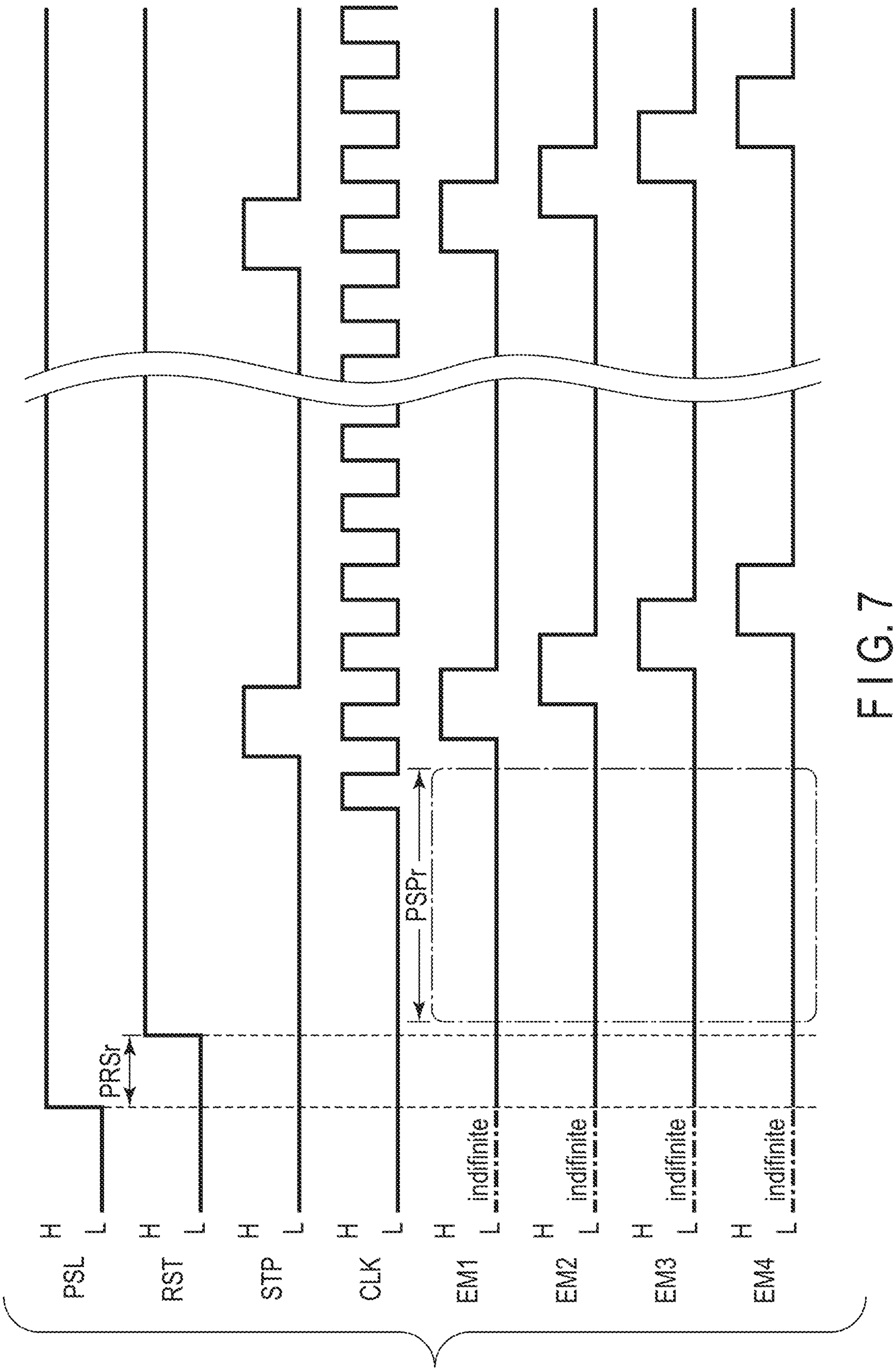
FIG. 7 is a timing chart of the shift register of the comparative example.

FIG. 7 is a timing chart of a shift register in a comparative example.

After the power supply signal PSL rises, that is, changes from a low level (L) to a high level (H), the reset signal RST changes from a low level (L) to a high level (H). Here, the period from completion of the rise of the power supply signal PSL to the point when the reset signal RST changes to the high level (H) is defined as a reset period PRSr.

Before the side of the power supply signal PSL, the light emission signal EM can take either high level (H) or low level (L). In the comparative example, the potential of the emission signal EM (emission signals EM1 to EM4 shown in FIG. 7) before the rise of the power supply signal PSL is "indefinite".

When a low-level (L) reset signal RST is input to the transistor TRRr_i, the transistor TRRr_i is set in an on state. Here, the source and drain of transistor TRRr_i are placed at the same potential (high level (H)) as that of the high-potential power supply VGH. The input terminal of the inverter INV_i, which is connected to one of the source and drain of the transistor TRRr_i, as well is place to the high level (H). Since the input terminal is set at the high level (H), the inverter INV_i outputs a low level (L) emission signal EMi from the output terminal.

When the light emission signal EMi is at the low level (L), the light emitting element ELM is connected to the high-potential power supply ELVDD and the low-potential power supply ELVSS, as shown in FIG. 5. In all the flip-flop circuits FF, an operation similar to that of the flip-flop circuit FF_i is performed. Therefore, the light emitting elements ELM of all pixels PX are connected to the high-potential power supply ELVDD and the low-potential power supply ELVSS in the reset period PRSr.

Even after the reset period PRS is over, all light emission signals EM remain at a low level (L). In other words, the state in which the light emitting elements ELM are connected to the high-potential power supply ELVDD and the low-potential power supply ELVSS is maintained.

After the reset period PRSr, the clock signal CLK is input to the other one of the source and drain of the transistor TMN and the other one of the source and drain of the transistor TMP in all flip-flop circuits FF. Further, thereafter, a start pulse STP is input to the node INP_1, which is the input terminal of the flip-flop circuit FF_1. In other words, the start pulse STP changes from a low level (L) to a high level (H).

After the start pulse STP changes to the high level (H), the light emitting signal EM1 changes from the low level (L) to the high level (H) at the timing when the clock signal CLK rises. When the light emitting signal EM1 is placed in the high level (H), the light emitting elements ELM are disconnected from the high-potential power supply ELVDD and the low-potential power supply ELVSS, as shown in FIG. 4.

The high-potential power supply ELVDD and the low-potential power supply ELVSS are connected to the light emitting elements ELM until the first start pulse STP rises after the reset signal RST rises. In the comparative example, the period from the rise of the reset signal RST to the rise of the first start pulse STP is defined as a power supply start-up period PSPr. During the power supply start-up period PSPr, the high-potential power supply ELVDD and the low-potential power supply ELVSS are started up.

The high-potential power supply ELVDD and the low-potential power supply ELVSS are, for example, 5V and 0V power supplies, respectively, as described above. In other words, it suffices if the potential difference between the high-potential power supply ELVDD and the low-potential power supply ELVSS is 5V. Even when the light emitting elements ELM are connected to the high-potential power supply ELVDD and the low-potential power supply ELVSS, if the gate potential of the transistor TRI, which is the current control transistor of the pixel circuit PC, is at an off potential, no current flows and the light emitting elements ELM do not emit light.

However, the gate potential of the current control transistor TRI is in an indefinite state immediately after the start-up of the power supplies, and there is a possibility that the current control transistor is not in the off state and current flows. In this case, the light emitting elements ELM emit undesired light.

Even with the shift register SRr shown in FIG. 6, it is possible to suppress undesired light emission by fixing the start pulse of the first frame at a high level (H) when the power supply is started up. The operation thereof will be described below.

Figure 8:
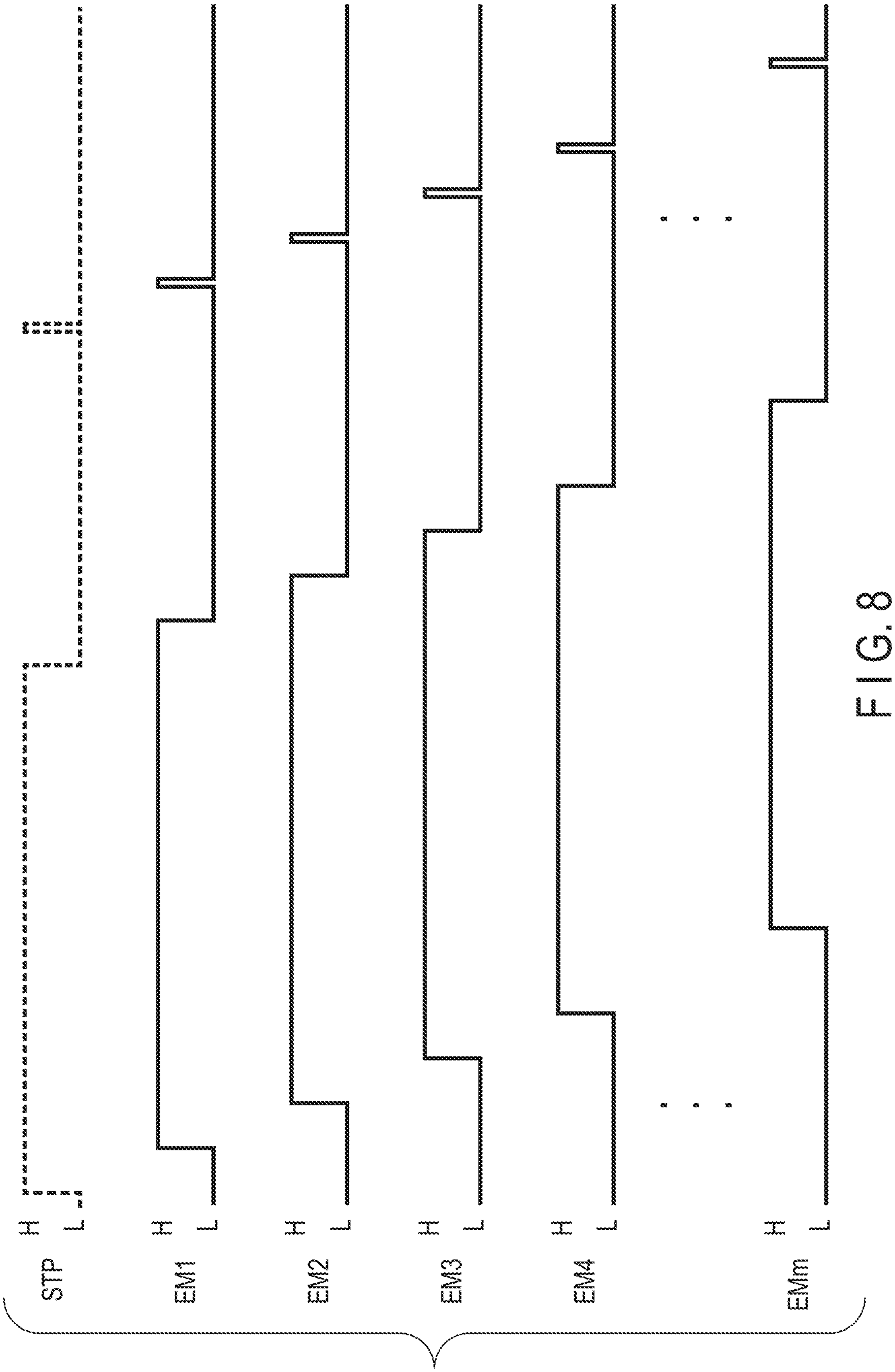
FIG. 8 is a timing chart indicating a power-on sequence to a pixel circuit of the comparative example.
Figure 9:
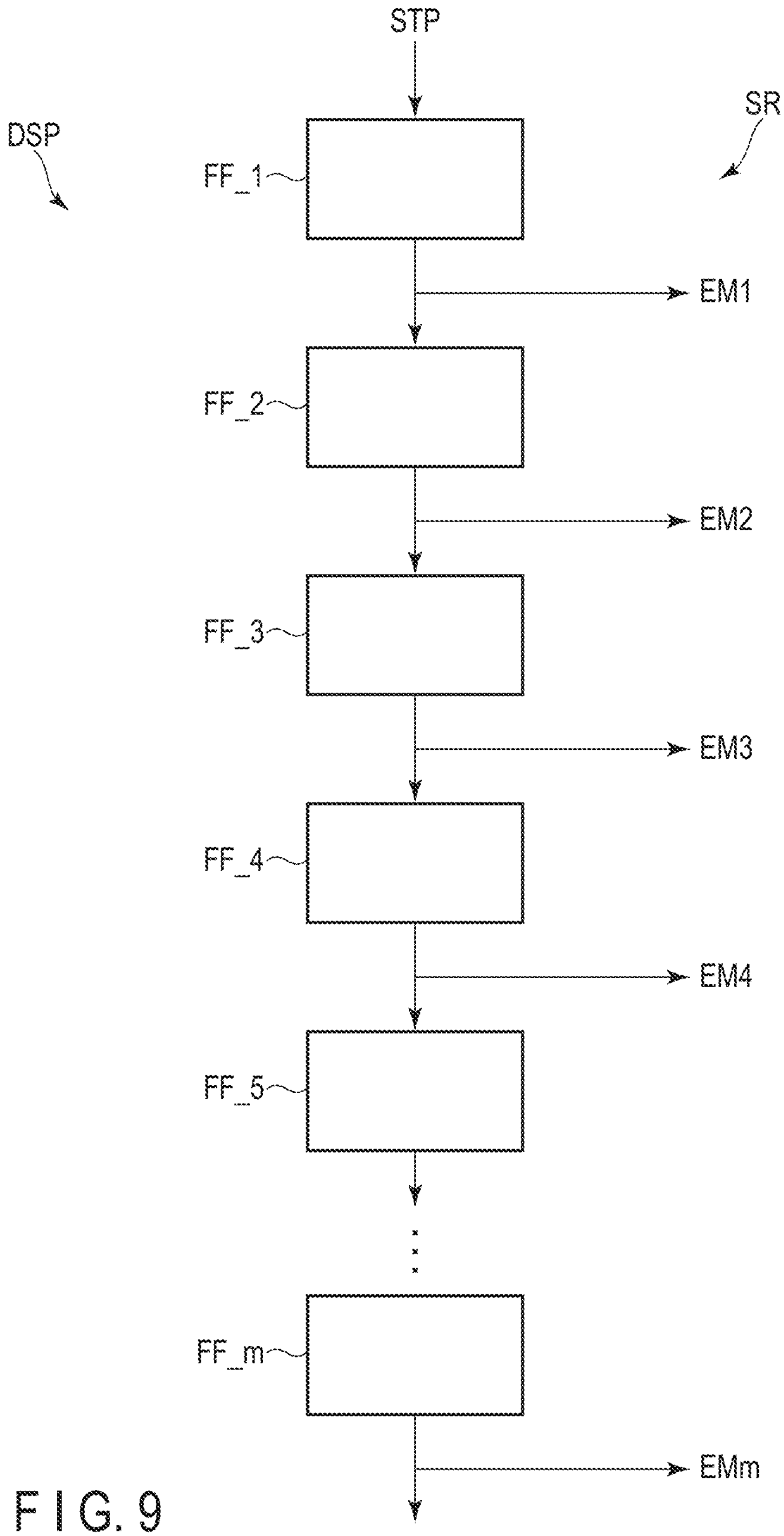
FIG. 9 is a block diagram showing a configuration example of the shift register which carries out an operation shown in FIG. 8.

FIG. 8 is a timing chart showing the power-on sequence for the pixel circuit of the comparative example. FIG. 9 is a block diagram schematically showing the configuration of the shift register that performs the operation shown in FIG. 8. In the first frame, the start pulse STP is fixed at the high level (H).

First, the start pulse STP is input to the flip-flop circuit FF_1 of the first stage of the shift register SR. The flip-flop circuit FF_1 outputs the light emission signal EM1 and also outputs a pulse (carry signal) to the flip-flop circuit FF_2 of the second stage. Since the start pulse STP is at the high level (H), the light emission signal EM1 as well is at the high level (H). The light emission signal EM1 is input to the pixel circuit PC of each of the pixels PX of the first row (first stage) via the respective scanning line GL. As a result, the light emission signal EM1 is input to the switch element SWT of each of the pixels PX of the first row, and the switch element SWT is set in the off state. Therefore, the light emitting element ELM of each of pixels PX of the first row is disconnected from the high-potential power supply ELVDD and the low-potential power supply ELVSS.

The flip-flop circuit FF_2 of the second stage, to which the above-described pulse (carry signal) is input, outputs a light emission signal EM2 and also outputs a pulse (carry signal) to the flip-flop circuit FF_2 of the third stage. As in the case of the pixels PX of the first row, the light emitting element ELM of each of the pixels PX of the second row is disconnected from the high-potential power supply ELVDD and the low-potential power supply ELVSS. From the third to the final stage (mth stage), an operation similar to that described above is performed, and the light emitting element ELM of each of all pixels PX is disconnected from the high-potential power supply ELVDD and the low-potential power supply ELVSS. At this time, high-level (H) emission signals EM (emission signals EM1 to EMm) are maintained in the switch elements SWT of all pixels PX.

When the light emitting element ELM of each of all pixels PX is disconnected from the EL power supply (EL power supply ELVDD and EL power supply ELVSS), the EL power supply rises. When the rise of the EL power supply is completed, the start pulse STP changes from the high level (H) to the low level (L). From here, the operation of the second frame starts.

A low-level (L) start pulse STP is input to the flip-flop circuit FF_1 of the first stage. Thus, the light emitting element ELM is placed at the low level (L). The switch element SWT of each of the pixels PX connected to the respective scanning lines GL of the first stage (first line) is set in the on state. The high-potential power supply ELVDD and the low-potential power supply ELVSS are connected to the light emitting element ELM of each of the PX pixels in the first row, and the light emitting element ELM is turned on.

A low-level (L) start pulse STP is input to the flip-flop circuit FF_1, and a pulse (carry signal) is output to the flip-flop circuit FF_2 of the second stage (second line). The switch element SWT of each of the pixels PX connected to the respective scanning lines GL of the second stage (second line) is set in the on state. The high-potential power supply ELVDD and the low-potential power supply ELVSS are connected to the light emitting element ELM of each of the pixels PX in the second row, and the light emitting element ELM is turned on.

From the third to the final stage (mth stage), an operation similar to that described above is performed, and all the light-emitting elements ELM of all the pixels PX are turned on. Thus, the operation of the second frame is completed.

In the first frame, the start pulse STP remains at the high level (H) until all the light emitting elements ELM of all the pixels PX are turned off. In the second frame, the start pulse STP remains at the low level (L) until all the light emitting elements ELM of all the pixels PX are turned on. But, in the third and subsequent frames, the start pulse STP is output as a pulse at the beginning of each frame.

In the operation of the shift register shown in FIGS. 8 and 9, it is possible to disconnect the light emitting elements ELM of all the pixels PX from the power supplies concerned at the start-up of the high-potential power supply ELVDD and low-potential power supply ELVSS. In this manner, unintended emission of light emitting elements ELM can be prevented.

However, in the operation of the shift register shown in FIGS. 8 and 9, the start pulse STP must be fixed at the high level (H) for one frame. Further, one frame is required to start up the high-potential power supply ELVDD and the low-potential power supply ELVSS. Such complex operations require sophisticated control and thus complicate the system. Furthermore, display devices with such shift registers may entails undesirably an increase in manufacturing costs.

In this embodiment, a reset element is provided in each shift register and the output of each shift register is collectively turned off. In this manner, it is possible to disconnect the light emitting elements ELM of all the pixels PX from the power supply merely by the reset signal input to the reset element.

Figure 10:
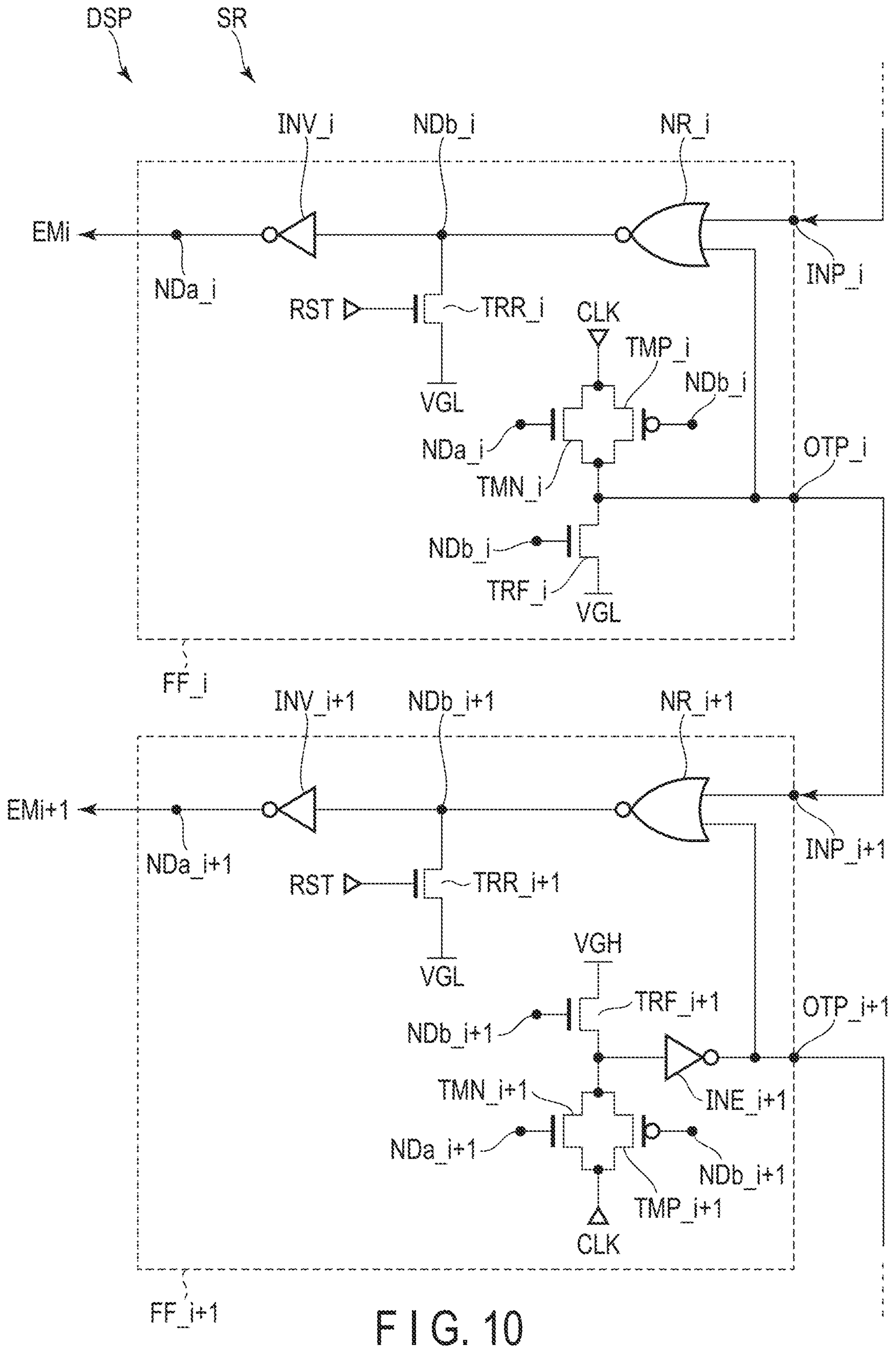
FIG. 10 is a circuit diagram showing a configuration of a shift register of the embodiment.

FIG. 10 is a circuit diagram showing the configuration of the shift register of the embodiment. The shift register SR shown in FIG. 10 includes a flip-flop circuit FF_i of the i-th stage (where i is a natural number which satisfies $1 \leq i \leq (m-1)$) and a flip-flop circuit FF_i+1 of the (i+1) stage.

The flip-flop circuit FF_i includes a NOR gate NR_i, a transistor TRR_i, an inverter INV_i, a transistor TMP_i, a transistor TMN_i and a transistor TRF_i.

Note that in FIG. 10, for the sake of clarity, connection lines are omitted, but the nodes NDa_i are connected to each other. Similarly, the nodes NDb_i are connected to each other.

One of the input terminals of the NOR gate NR_i is connected to the node INP_i. The other one of the input terminals of the NOR gate NR_i is connected to one of the source and drain of transistor TMP_i, one of the source and drain of the transistor TMN_i, one of the source and drain of the transistor TRF_i, and the node OTP_i. The output terminal of the NOR gate NR_i is connected to one of the source and drain of the transistor TRR_i, the input terminal of the inverter INV_i and the node NDb_i.

The transistor TRR_i is an n-channel transistor. One of the source and drain of the transistor TRR_i is connected to the output terminal of the NOR gate NR_i, the input terminal of the inverter INV_i and the node NDb_i. The other one of the source and drain of the transistor TRR_i is connected to the low-potential power supply VGL. The reset signal RST is input to the gate of the transistor TRR_i. The transistor TRR_i corresponds to a reset element.

The transistor TMP_i is a p-channel transistor. One of the source and drain of the transistor TMP_i is connected to the other one of the input terminals of the NOR gate NR_i, one of the source and drain of the transistor TMN_i, one of the source and drain of the transistor TRF_i and the node OTP_i. The other one of the source and drain of the transistor TMP_i is connected to the other one of the source and drain of the transistor TMN_i, and the clock signal CLK is input thereto. The gate of transistor TMP_i is connected to the node NDb_i.

The transistor TMN_i is an n-channel transistor. One of the source and drain of the transistor TMN_i is connected to one of the source and drain of the transistor TMP_i, the other one of the input terminals of the NOR gate NR_i, one of the source and drain of the transistor TRF_i and the node OTP_i. The other one of the source and drain of the transistor TMN_i is connected to the other one of the source and drain of the transistor TMP_i, and the clock signal CLK is input thereto. The gate of transistor TMN_i is connected to the node NDa_i.

The transistor TMN_i and the transistor TMP_i are connected to each other by source-to-source and drain-to-drain, to constitute a transmission gate.

The transistor TRF_i is an n-channel transistor. One of the source and drain of the transistor TRF_i is connected to one of the source and drain of the transistor TMN_i, one of the source and drain of the transistor TMP_i, the other one of the input terminal of the NOR gate NR_i and the node OTP_i. The other one of the source and drain of the transistor TRF_i is connected to the low-potential power supply VGL. The gate of the transistor TRF_i is connected to the node NDb_i.

The node INP_i is an input terminal of the flip-flop circuit FF_i. The carry signal is input to the node INP_i from the output terminal (node OTP_i−1 (not shown)) of the flip-flop circuit (flip-flop circuit FF_i−1 (not shown)) of the previous stage. The node OTP_i is an output terminal of the flip-flop circuit FF_i. The carry signal is output from the node OTP_i to the input terminal (node INP_i+1) of the flip-flop circuit FF_i+1 of the next stage.

The light emission signal EMi is output from the output terminal of the inverter INV_i via the node NDa_i. When the light emission signal EMi is input to the pixel circuit PC of a pixel PX as described above, the light emitting element ELM emits light.

The flip-flop circuit FF_i+1 of the (i+1)-stage includes a NOR gate NR_i+1, a transistor TRR_i+1, inverter INV_i+1, a transistor TMP_i+1, a transistor TMN_i+1, a transistor TRF_i+1 and an inverter INE_i+1.

As in the case described above, for the sake of clarity in the drawing, connection lines are omitted, the nodes NDa_i+1 are connected to each other. Similarly, the nodes NDb_i+1 are connected to each other.

One of the input terminals of the NOR gate NR_i+1 is connected to the node INP_i+1. The other one of the input terminals of the NOR gate NR_i+1 is connected to the output terminal of the inverter INE_i+1 and the node OTP_i+1. The output terminal of the NOR gate NR_i+1 is connected to one of the source and drain of the transistor TRR_i+1, the input terminal of the inverter INV_i+1 and the node NDb_i+1.

The transistor TRR_i+1 is an n-channel transistor. One of the source and drain of the transistor TRR_i+1 is connected to the output terminal of the NOR gate NR_i+1, the input terminal of the inverter INV_i+1 and the node NDb_i+1. The other one of the source and drain of the transistor TRR_i+1 is connected to the low-potential power supply VGL. The reset signal RST is input to the gate of the transistor TRR_i+1. The transistor TRR_i+1 corresponds to a reset element.

The transistor TMP_i+1 is a p-channel transistor. One of the source and drain of the transistor TMP_i+1 is connected to the input terminal of the inverter INE_i+1, one of the source and drain of the transistor TMN_i+1 and one of the source and drain of the transistor TRF_i+1. The other one of the source and drain of the transistor TMP_i+1 is connected to the other one of the source and drain of the transistor TMN_i+1, and the clock signal CLK is input thereto. The gate of the transistor TMP_i+1 is connected to the node NDb_i+1.

The transistor TMN_i+1 is an n-channel transistor. One of the source and drain of the transistor TMN_i+1 is connected to the input terminal of the inverter INE_i+1, one of the source and drain of the transistor TMP_i+1 and one of the source and drain of the transistor TRF_i+1. The other one of the source and drain of the transistor TMN_i+1 is connected to the other one of the source and drain of the transistor TMP_i+1, and the clock signal CLK is input thereto. The gate of the transistor TMN_i+1 is connected to the node NDa_i+1.

The transistor TMN_i+1 and the transistor TMP_i+1 are connected to each other by source-to-source and drain-to-drain to form a transmission gate.

The transistor TRF_i+1 is an n-channel transistor. One of the source and drain of the transistor TRF_i+1 is connected to the input terminal of the inverter INE_i+1, one of the source and drain of the transistor TMN_i+1 and one of the source and drain of the transistor TMP_i+1. The other one of the source and drain of the transistor TRF_i+1 is connected to a high-potential power supply VGH. The gate of the transistor TRF_i is connected to the node NDb_i+1.

The input terminal of the inverter INE_i+1 is connected to one of the source and drain of the transistor TRF_i+1, one of the source and drain of the transistor TMN_i+1 and one of the source and drain of the transistor TMP_i+1. The output terminal of the inverter INE_i+1 is connected to the other one of the input terminals of the NOR gate NR_i+1 and the node OTP_i+1.

The light emission signal EMi+1 is output from the output terminal of the inverter INV_i+1 via the node NDa_i+1. When the light emission signal EMi+1 is input to the pixel circuit PC of a pixel PX as described above, the light emitting element ELM emits light.

The node INP_i+1 is an input terminal of the flip-flop circuit FF_i+1. The carry signal is input to the node INP_i+1 from the output terminal (node OTP_i) of the flip-flop circuit FF_i of the previous stage. The node OTP_i+1 is an output terminal of the flip-flop circuit FF_i+1. The carry signal is output from the node OTP_i+1 to the input terminal (node INP_i+2 (not shown)) of the flip-flop circuit (flip-flop circuit FF_i+2 (not shown)) of the next stage. Note that when the flip-flop circuit FF_i+1 is the last stage (i+1=m), there is no flip-flop circuit in the next stage.

The circuit configuration of the flip-flop circuit FF_i is used, for example, for flip-flop circuits of odd-numbered stages. The circuit configuration of the flip-flop circuit FF_i+1 is used, for example, for flip-flop circuits of even-numbered stages.

Figure 11:
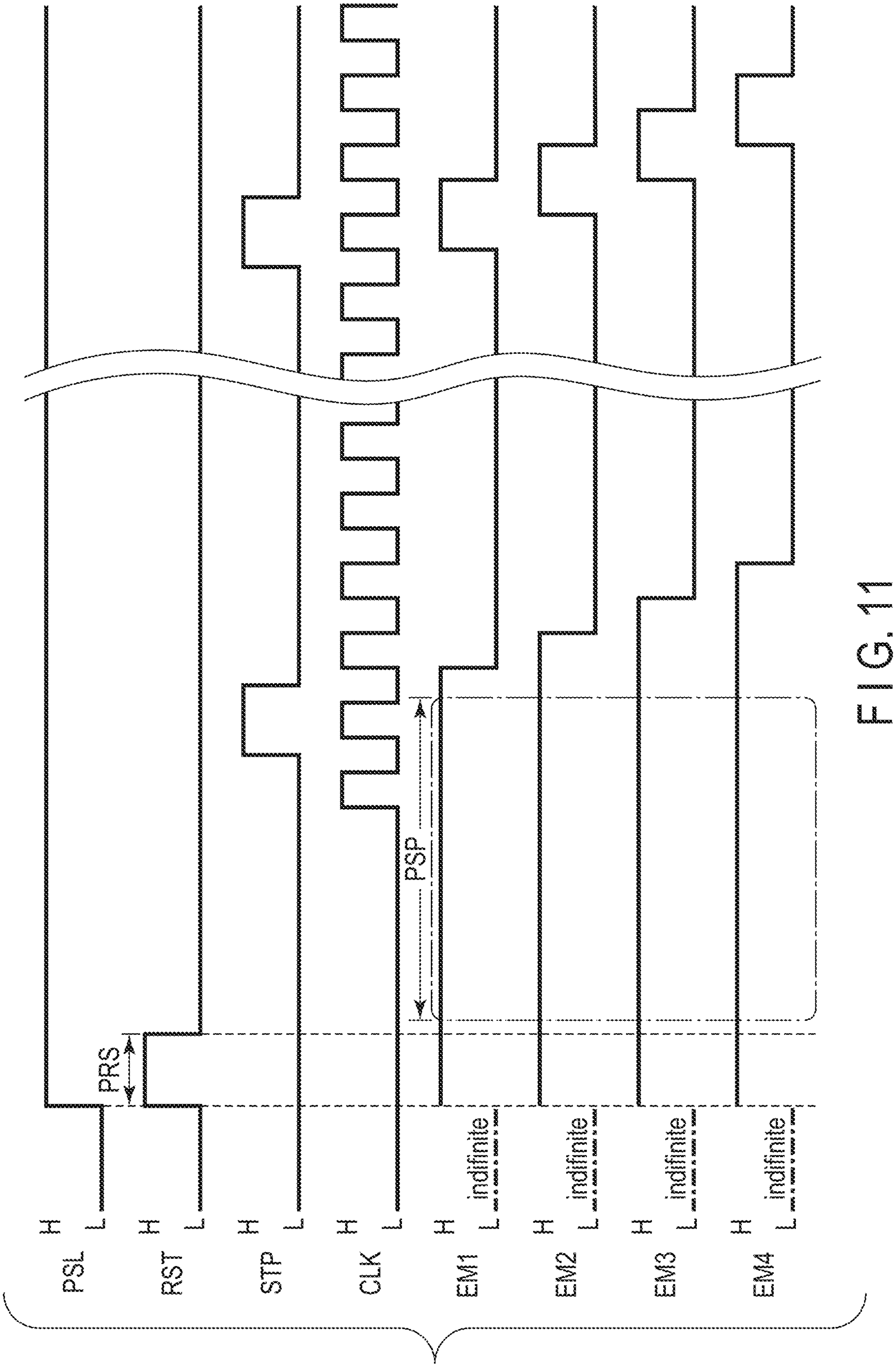
FIG. 11 is a timing chart of the shift register of the embodiment.

FIG. 11 is a timing chart of the shift register of the embodiment. First, the power supply signal PSL rises, that is, it changes from the low level (L) to the high level (H).

At the timing when the power supply signal PSL changes from the low level (L) to the high level (H), the reset signal RST is input. The reset signal RST changes from the low level (L) to the high level (H). The period until the next time the reset signal RST at the high level (H) changes to the low level (L) is defined as a reset period PRS.

When the high-level (H) reset signal RST is input to the transistor TRR_i, the transistor TRR_i is set in the on state. The source and drain of the transistor TRR_i is set to the same potential as that of the low-potential power supply VGL (low level (L)). The input terminal of the inverter INV_i, which is connected to one of the source and drain of the transistor TRR_i, as well is set to the low level (L). Since the input terminal is at the low level (L), the inverter INV_i outputs a high-level (H) emission signal EMi from the output terminal.

When the light emission signal EMi is at the high level (H), the light emitting element ELM is disconnected from the high-potential power supply ELVDD and the low-potential power supply ELVSS, as shown in FIG. 4. In all the flip-flop circuits FF, an operation similar to that of the flip-flop circuit FF_i is performed. Therefore, the light emitting elements ELM of all the pixels PX are disconnected from the high-potential power supply ELVDD and the low-potential power supply ELVSS in the reset period PRS.

Even after the reset period PRS is over, all the light emission signals EM remain at the high level (H). In other words, the state in which the light emitting elements ELM are disconnected from the high-potential power supply ELVDD and the low-potential power supply ELVSS is maintained.

After the reset period PRS, the clock signal CLK is input to the other one of the source and drain of the transistor TMN and the other one of the source and drain of the transistor TMP in all the flip-flop circuits FF. Further, thereafter, the start pulse STP is input to the node INP_1, which is the input terminal of the flip-flop circuit FF_1. In other words, the start pulse STP changes from the low level (L) to the high level (H).

At the timing when the start pulse STP falls, that is, changes from the high level (H) to the low level (L), the light emission signal EM1 changes from the high level (H) to the low level (L). When the light emission signal EM1 is at the low level (L), the light emitting element ELM is connected to the high-potential power supply ELVDD and the low-potential power supply ELVSS, as shown in FIG. 5. As a result, the pixels PX connected to the scanning lines GL in the first row (first stage) emit light.

When a carry signal is output from the flip-flop circuit FF_1 of the first stage to the flip-flop circuit FF_2 of the second stage, the flip-flop circuit FF_2 operates in a similar manner to that of the flip-flop circuit FF_1. Thereafter, the above operation is repeated in order from the flip-flop circuit FF 3 of the third stage to the flip-flop circuit FF m of the final stage.

After the light emission signal EM1 changes from the high level (H) to the low level (L), the light emission signals EM2 to EMm change from the high level (H) to the low level (L) in order at the timing of the fall of the clock signal CLK (changing from a high level (H) to a low level (L)).

The high-potential power supply ELVDD and the low-potential power supply ELVSS are disconnected from the light emitting element ELM after the reset signal RST is input until the first start pulse STP falls. The period after the reset signal RST is input until the first start pulse STP falls is defined as a power supply start-up period PSP. During the power supply start-up period PSP, the start-up of the high-potential power supply ELVDD and the low-potential power supply ELVSS should be completed.

In this embodiment, during the power supply start-up period PSP, the light emitting elements ELM are disconnected from the high-potential power supply ELVDD and the low-potential power supply ELVSS. Therefore, undesired light emission does not occur. Thus, it is possible to obtain a display device DSP with improved light emission quality.

Configuration Example 1

Figure 12:
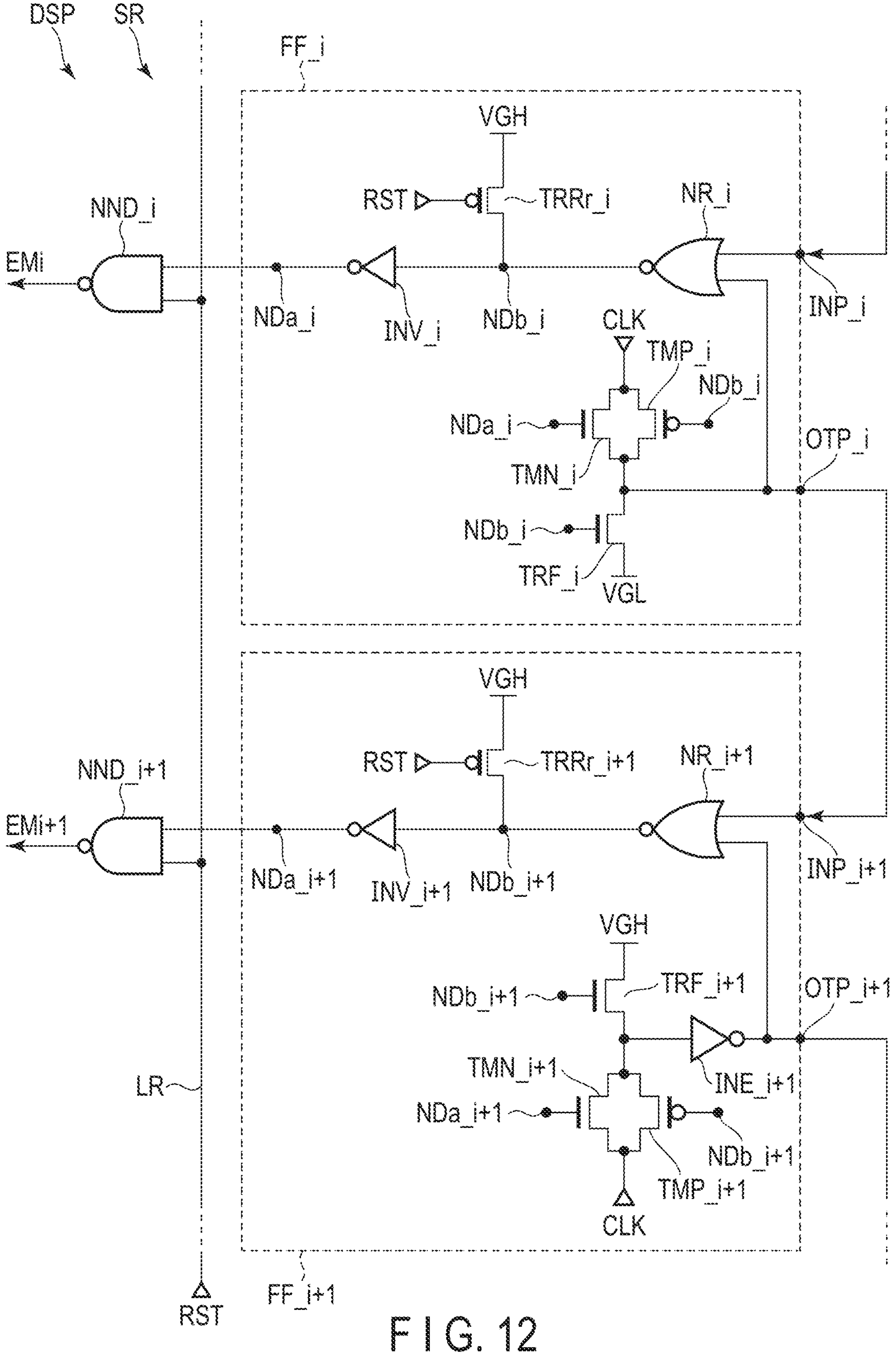
FIG. 12 is a diagram showing a configuration example of a display device of an embodiment.

FIG. 12 is a diagram showing another configuration example of the display device in the embodiment. The configuration example shown in FIG. 12 is different from that of FIG. 10 in that a NAND gate is connected to the shift register.

In the shift register SR shown in FIG. 12, a NAND gate NND_i is connected to the output terminal of the inverter INV_i of the flip-flop circuit FF_i via the node NDa_i. One of the input terminals of the NAND gate NND_i is connected to the output terminal of the inverter INV_i, as described above. The other one of the input terminals of the NAND gate NND_i is connected to the other one of the input terminals of the NAND gate NND_i of another stage via a wiring line LR. In FIG. 12, the other one of the input terminals of the NAND gate NND_i is connected to the NAND gate NND_i+1 via the wiring line LR. The light emission signal EMi is output from the output terminal of the NAND gate NND_i. The reset signal RST is input to the wiring line LR.

In the shift register SR shown in FIG. 12, the configuration other than the NAND gate NND (NND_i and NND_i+1) and the wiring line LR is similar to that shown in FIG. 6. The NAND gate NND corresponds to a reset element, which is connected to the flip-flop circuit FF.

Figure 13:
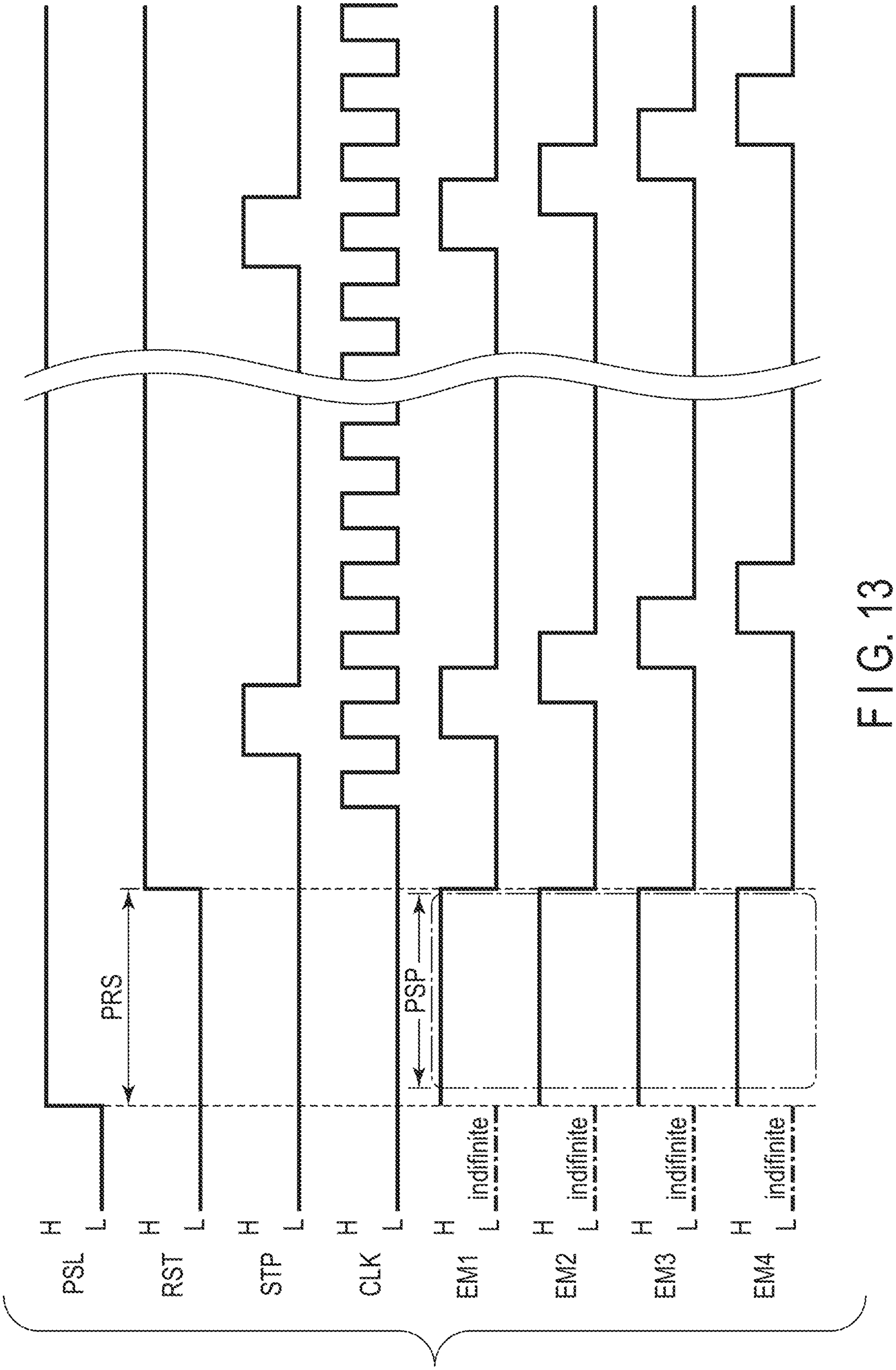
FIG. 13 is a timing chart of a shift register of Configuration Example 1.

FIG. 13 is a timing chart for the shift register of Configuration Example 1. As in the case of FIG. 11, after the power supply signal PSL changes from the low level (L) to the high level (H), the reset signal RST changes from the low level (L) to the high level (H). The period after the power supply signal PSL rises until the reset signal RST changes to the high level (H) is defined as a reset period PRS.

As in the case of FIG. 11, before the power supply signal PSL rises, the light emission signal EM can take either a high level (H) or low level (L). In this configuration example, the potential of the emission signals EM (emission signals EM1 to EM4 in FIG. 13) before the rise of the power supply signal PSL is indefinite.

When a low-level (L) reset signal RST is input to the transistor TRRr_i, the transistor TRRr_i is set in an on state. The source and drain of transistor TRRr_i are set to the same potential as that of the high-potential power supply VGH (high level (H)). The input terminal of the inverter INV_i, which is connected to one of the source and drain of the transistor TRRr_i, is also set to the high level (H). Since the potentials of both input terminals are set to the high level (H), the inverter INV_i outputs a low level signal from its output terminal.

From the output terminal of inverter INV_i, a low level (L) signal is input to one of the input terminals of the NAND gate NND_i. On the other hand, a low level (L) reset signal RST is input to the other input terminal of the NAND gate NND_i. Since a low level (L) signal is input from both input terminals, the NAND gate NND_i outputs a high-level (H) light emission signal EMi from the output terminal. FIG. 13 shows that the light emission signals EM1 to EM4 are at the high level (H).

When the light emission signal EMi is at the high level (H), the light emitting element ELM is disconnected from the high-potential power supply ELVDD and the low-potential power supply ELVSS, as shown in FIG. 4. In all the flip-flop circuits FF, an operation similar to that of the flip-flop circuit FF_i is performed. Therefore, the light emitting elements ELM of all the pixels PX are disconnected from the high-potential power supply ELVDD and the low-potential power supply ELVSS in the reset period PRS.

When the reset signal RST changes from the low level (L) to the high level (H), a high-level (H) signal is input to both input terminals of the NAND gate NND_i. Therefore, the light emission signal EMi output from the output terminal of the NAND gate NND_i changes to the low level (L). Since the light emission signal EMi is at the low level (L), the light emitting element ELM is connected to the high-potential power supply ELVDD and the low-potential power supply ELVSS, as shown in FIG. 5.

The high-potential power supply ELVDD and the low-potential power supply ELVSS should be started up during the same period as that of the reset period PRS. That is, in this configuration example, the reset period PRS and the power supply start-up period PSP should be simultaneous. In this configuration example as well, during the period while the high-potential power supply ELVDD and the low-potential power supply ELVSS and the light emitting element ELM are disconnected, the high-potential power supply ELVDD and the low-potential power supply ELVSS are started up. Therefore, undesired light emission does not occur, and it is possible to obtain a display device DSP with improved light emission quality.

After the reset period PRS and the power supply start-up period PSP are over, the clock signal CLK is input to the pixel circuit PC. After that, the start pulse STP is input in order from the flip-flop circuit FF_1 of the shift register SR.

After the start pulse STP is input, at the timing when the clock signal CLK rises, the light emission signal EM1 changes from the low level (L) to the high level (H). Since the light emitting signal EM1 is set to the high level (H), the light emitting element ELM is disconnected from the high-potential power supply ELVDD and the low-potential power supply ELVSS.

At the timing when the next clock signal CLK rises, the light emission signal EM1 changes from the high level (H) to the low level (L). As a result, the light emitting element ELM is connected to the high-potential power supply ELVDD and the low-potential power supply ELVSS. Therefore, the light emitting element ELM emits light.

In this configuration example, it is preferable to set the potential in the pixel circuit PC so that there is no unnecessary emission of light when connected to the pixel circuit PC, the high-potential power supply ELVDD and the low-potential power supply ELVSS after the reset period RST and before the start pulse STP is input.

After the light emission signal EM1 changes from the low level (L) to the high level (H), the light emission signal EM2 changes from the low level (L) to the high level (H) at the timing of the fall of the clock signal CLK. The light emitting signal EM2 changes from the high level (H) to the low level (L) at the timing of the fall of the next clock signal CLK.

By repeating the above-described operations, the light emitting elements ELM of the pixels PX connected to the corresponding scanning lines GL emit light based on the change in the light emission signal EM for each stage (each scanning line GL).

In this configuration example as well, advantageous effects similar to those of the embodiment can be exhibited.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:

a plurality of pixels;

a pixel circuit provided in each of the plurality of pixels;

a plurality of scanning lines connected to the plurality of pixels;

a plurality of signal lines connected to the plurality of pixels;

a scanning line drive circuit connected to the plurality of scanning lines;

a signal line drive circuit connected to the plurality of pixels;

a shift register provided in the scanning line drive circuit;

a plurality of flip-flop circuits provided in the shift register; and a reset element provided in each of the plurality of flip-flop circuits, wherein the reset element is an n-channel type transistor, the pixel circuit includes a light emitting element, a light emitting power supply and a switch element, the light emitting power supply includes a high-potential power supply and a low-potential power supply, the high-potential power supply, the switch element, the light emitting element, and the low-potential power supply are connected in series, a light emission signal is output from each of the plurality of flip-flop circuits, and when the light emission signal is input to the switch element, the light emitting element emits light, while a power supply signal changes from a low level to a high level, a reset signal changes from a low level to a high level, when the high-level reset signal is input to the reset element, the reset element is set in the on state, when the reset element is set in the on state, each of the plurality of flip-flop circuits outputs a high-level emission signal, when the light emission signal is at the high level, the light emitting element is disconnected from the high-potential power supply and the low-potential power supply, and when the light emitting element is disconnected from the high-potential power supply and the low-potential power supply, a start-up of the high-potential power supply and the low-potential power supply are completed.

2. The display device according to claim 1, wherein the light emitting element is an organic electroluminescent light emitting element.

3. The display device of claim 1, wherein each of the plurality of flip-flop circuit comprises a NOR gate, a transmission gate and an inverter, one of a source and a drain of the n-channel type transistor is connected to an output terminal of the NOR gate and an input terminal of the inverter, an other of the source and drain of the n-channel transistor is connected to a low-potential power supply, a reset signal is input to a gate of the n-channel transistor, and a light emission signal is output from an output terminal of the inverter to the pixel circuit.

4. The display device according to claim 1, wherein the reset signal input to the gate of the n-channel transistor is at a low level while the emission power supply is rising.

5. A display device comprising:

a plurality of pixels;

a pixel circuit provided in each of the plurality of pixels;

a plurality of scanning lines connected to the plurality of pixels;

a plurality of signal lines connected to the plurality of pixels;

a scanning line drive circuit connected to the plurality of scanning lines;

a signal line drive circuit connected to the plurality of pixels;

a shift register provided in the scanning line drive circuit;

a plurality of flip-flop circuits provided in the shift register; and a reset element provided in each of the plurality of flip-flop circuits, wherein the reset element is a NAND gate, the pixel circuit includes a light emitting element, a light emitting power supply and a switch element, the light emitting power supply includes a high-potential power supply and a low-potential power supply, the high-potential power supply, the switch element, the light emitting element, and the low-potential power supply are connected in series, a light emission signal is output from each of the plurality of flip-flop circuits, and when the light emission signal is input to the switch element, the light emitting element emits light, while a power supply signal changes from a low level to a high level, a reset signal changes from a low level to a high level, when the high-level reset signal is input to the reset element, the reset element is set in the on state, when the reset element is set in the on state, each of the plurality of flip-flop circuits outputs a high-level emission signal, when the light emission signal is at the high level, the light emitting element is disconnected from the high-potential power supply and the low-potential power supply, and when the light emitting element is disconnected from the high-potential power supply and the low-potential power supply, a start-up of the high-potential power supply and the low-potential power supply are completed.

6. The display device according to claim 5, wherein the light emitting element is an organic electroluminescent light emitting element.

7. The display device according to claim 5 further comprising:

a wiring line to which the reset signal is input, wherein each of the plurality of flip-flop circuits comprises a NOR gate, a transmission gate and an inverter, one of input terminals of the NAND gate is connected to an output terminal of the inverter, an other input terminal of the NAND gate is connected to the wiring line, and a light emission signal is output from the output terminal of the NAND gate to the pixel circuit.

8. The display device according to claim 7, wherein the reset signal input to the other one of the input terminals of the NAND gate via the wiring line while the emission power supply is rising is at a low level.

* * * * *